United States Patent
Dale

(10) Patent No.: US 10,712,183 B2
(45) Date of Patent: Jul. 14, 2020

(54) DETERMINING FLOW RATES OF MULTIPHASE FLUIDS

(71) Applicant: ONESUBSEA IP UK LIMITED, London (GB)

(72) Inventor: Helge Dale, Raadal (NO)

(73) Assignee: ONESUBSEA IP UK LIMITED, London (GB)

( * ) Notice: Subject to any disclaimer, the term of this patent is extended or adjusted under 35 U.S.C. 154(b) by 105 days.

(21) Appl. No.: 16/083,115

(22) PCT Filed: Mar. 9, 2016

(86) PCT No.: PCT/EP2016/054996
§ 371 (c)(1),
(2) Date: Sep. 7, 2018

(87) PCT Pub. No.: WO2017/152967
PCT Pub. Date: Sep. 14, 2017

(65) Prior Publication Data
US 2019/0094055 A1 Mar. 28, 2019

(51) Int. Cl.
*G01F 1/44* (2006.01)
*E21B 41/00* (2006.01)
(Continued)

(52) U.S. Cl.
CPC ............ *G01F 1/44* (2013.01); *E21B 41/0007* (2013.01); *F04D 13/086* (2013.01); *F04D 15/0088* (2013.01); *F04D 31/00* (2013.01); *G01F 1/36* (2013.01); *G01F 1/74* (2013.01); *F05D 2260/84* (2013.01)

(58) Field of Classification Search
CPC .................................. G01F 1/44; E21B 41/00
See application file for complete search history.

(56) References Cited

U.S. PATENT DOCUMENTS 4,427,336 A * 1/1984 Lake .................. F04D 29/2216
415/71
4,721,435 A * 1/1988 Kuah .................... F04D 29/669
415/143
(Continued)

FOREIGN PATENT DOCUMENTS

WO 2016074956 A1 5/2016

OTHER PUBLICATIONS

Sulzer, "MPP High Performance Multiphase Pump", Nov. 2014, 6 pages, https://www.sulzer.com/-/media/files/products/pumps/multiphase-pumps/brochures/mpp_high_performance_multi_phase_pump_e00601.ashx.
(Continued)

*Primary Examiner* — Jewel V Dowtin
(74) *Attorney, Agent, or Firm* — Helene Raybaud

(57) ABSTRACT

A method for determining flow rate of a multiphase fluid. The method includes measuring a first pressure differential (316) of the multiphase fluid flowing through a rotodynamic pump (310) operating at a rotational speed thereby driving the multiphase fluid, measuring a second pressure differential (326) of the multiphase fluid flowing through a portion (320) of a fluid conduit positioned in series with said rotodynamic pump, and determining, based on the first and second pressure differentials and the rotational speed of said rotodynamic pump, a flow rate of the multiphase fluid.

24 Claims, 14 Drawing Sheets

(51) Int. Cl.
  *F04D 15/00* (2006.01)
  *F04D 31/00* (2006.01)
  *G01F 1/36* (2006.01)
  *F04D 13/08* (2006.01)
  *G01F 1/74* (2006.01)

(56) References Cited

U.S. PATENT DOCUMENTS

| | | | | |
|---|---|---|---|---|
| 4,842,806 | A * | 6/1989 | Ohtomi | G21C 17/032 376/247 |
| 5,890,883 | A * | 4/1999 | Golding | F04D 29/047 417/423.12 |
| 6,059,539 | A * | 5/2000 | Nyilas | E21B 43/01 417/228 |
| 6,234,030 | B1 * | 5/2001 | Butler | E21B 21/01 73/195 |
| 7,516,795 | B2 * | 4/2009 | Lopes Euphemio | E21B 43/01 166/268 |
| 7,654,151 | B2 * | 2/2010 | Agar | G01F 1/50 73/861.01 |
| 7,780,402 | B2 * | 8/2010 | Buschkopf | F04D 29/128 415/39 |
| 8,287,231 | B2 * | 10/2012 | Burgess | F04D 15/0033 415/9 |
| 8,905,728 | B2 * | 12/2014 | Blankemeier | F04D 13/022 277/630 |
| 8,905,729 | B2 * | 12/2014 | Blankemeier | F04D 13/0673 277/630 |
| 8,939,033 | B2 * | 1/2015 | Baker | G01F 1/44 73/861.04 |
| 9,574,562 | B2 * | 2/2017 | Van Dam | F04D 29/183 |
| 9,920,764 | B2 * | 3/2018 | Shafer | F04D 13/027 |
| 9,920,885 | B2 * | 3/2018 | Bibet | F04C 13/008 |
| 2004/0182172 | A1 | 9/2004 | Richards | |
| 2007/0160465 | A1 * | 7/2007 | Roudnev | F04D 29/167 415/170.1 |
| 2007/0212238 | A1 * | 9/2007 | Jacobsen | F04D 1/063 417/423.1 |
| 2014/0027546 | A1 * | 1/2014 | Kean | B02C 23/00 241/21 |
| 2016/0084024 | A1 * | 3/2016 | Dillard | E21B 21/08 |
| 2017/0175757 | A1 * | 6/2017 | Shafer | F04D 7/045 |

OTHER PUBLICATIONS

Sulzer, "MPP-OHH Single Stage Multiphase Pump ISO 13709", May 1, 2008, 4 pages, https://www.sulzer.com/-/media/files/products/pumps/multiphase-pumps/brochures/mpp_ohh_e10013.ashx.
Jones et al., "ISO 13709 2nd Edition / API 610 Eleventh Edition Highlights", Twenty-Seventh International Pumpl User, Symposium, Sep. 15, 2011, pp. 50-69.
Hua et al., "Comparison of Multiphase Pumping Technologies for Subsea and Downhole Applications", Oil and Gas Facilities, vol. 1, No. 01, Feb. 2012, pp. 36-46.
International Search Report issued in International Patent Appl. No. PCT/EP2016/054996 dated Jun. 9, 2016; 5 pages.
Written Opinion issued in International Patent Appl. No. PCT/EP2016/054996 dated Jun. 9, 2016; 7 pages.

* cited by examiner

Add water cut meter in line with pump

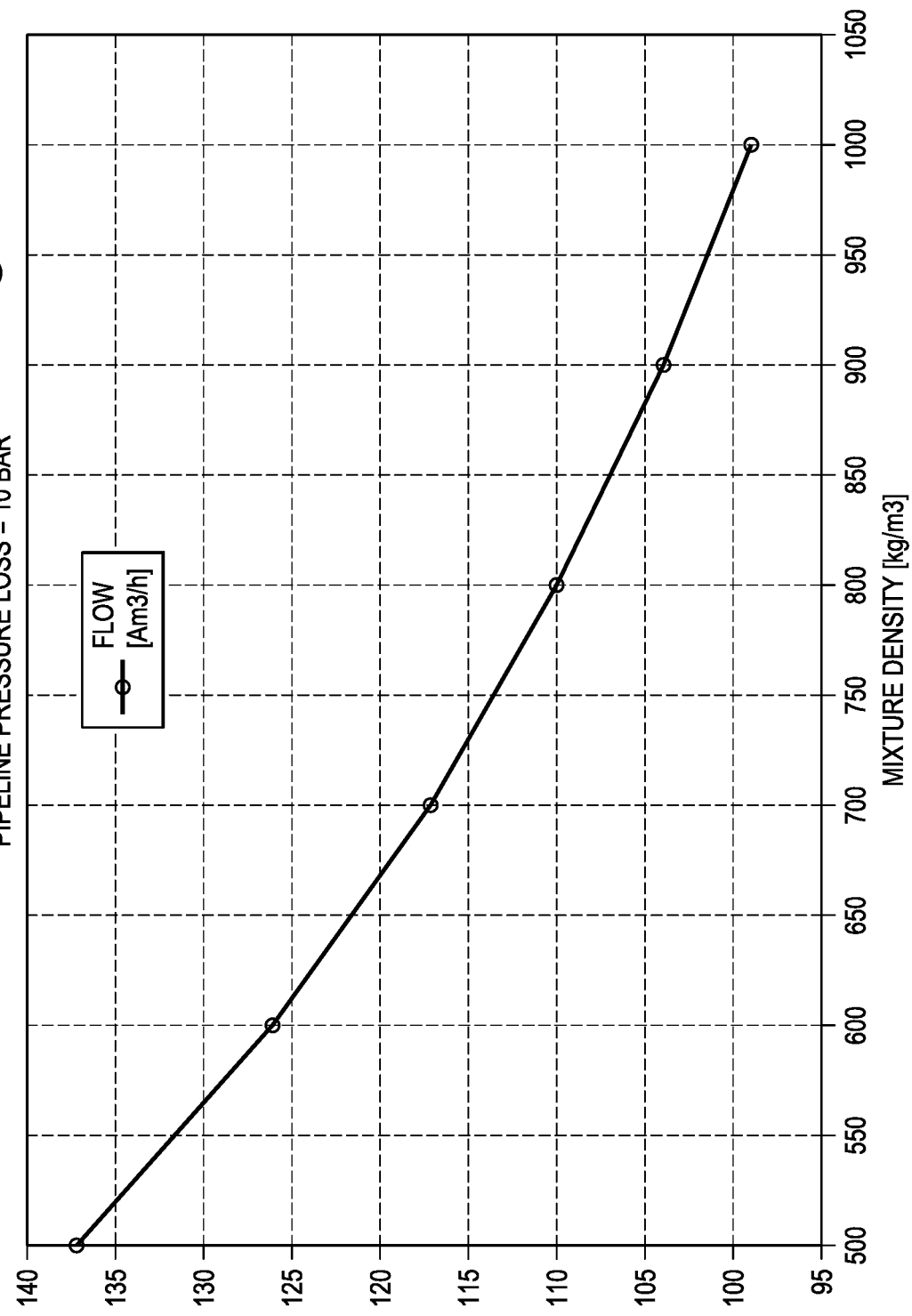

DETERMINING FLOW RATES OF MULTIPHASE FLUIDS

FIELD

The present disclosure relates generally to determination of flow rate in multiphase flows driven by pumps. More particularly, the present disclosure relates to determining flow rates of multiphase fluids driven by rotodynamic pumps in the oil and gas industry in field locations such as subsea and surface environments.

BACKGROUND

The determination of gas and liquid flow rates in gas-liquid fluid mixtures is important for monitoring of rotodynamic pumps. Rotodynamic pumps often have a recommended operating range with respect to flow rate. If the flow rate is too high or too low (surge occurrence), the pump lifetime may be reduced and the risk of mechanical failure is increased. This is true for both single-phase and multiphase rotodynamic pumps.

For a single-phase pump, a "single phase" flowmeter (venturi, V-cone, orifice plate or similar) may be utilized to monitor the flow rates seen by the pump. These flow meters have a differential pressure transmitter, and based on the fluid density the flow rate can be calculated. The calculated flow rate is used to indicate whether the pump is being operated in a safe range. If not, the pump will "trip" or the control system will adjust speed, recycling rate or other parameters to move the operating point inside the recommended operating range.

For multiphase pump systems, a difficulty is that the mixture density varies with time and is generally not known. As a result, the flow meters used for a single phase pump are not accurate since the flow rate cannot accurately be calculated when mixture density is unknown.

In some cases, historical data for multiphase fluids is used for multiphase flow rate calculations. In the example of pumps used within the oilfield services applications, water-cut and gas oil ratio (GOR) can be used as manual input. A minimum flow rate can then be calculated based on pressure, temperature and speed measurements. However, this method can suffer from poor reliability and inaccurate results, particularly since the actual watercut or GOR vary with time and thus are likely different from historical data used by the control system.

Another solution to protect a multiphase pump from undesirable high or low flow in the oilfield domain is to use an apparatus like the Schlumberger's VX™ system, which comprises a vertically mounted Venturi flow meter, a dual energy gamma-ray hold up measuring device and associated processors. This system allows the simultaneous calculation of gas, water and oil volumetric flow rates in multiphase flows. However, despite providing proven performance, the VX™ system and other conventional multiphase flow meters are relatively expensive and complex. Their reliability/availability is often lower than standard "single phase" meters. Another drawback is that multiphase meter measurements are based on statistics and a 30-60 second sampling time is often used. As a result, the method may be less able to detect rapid changes in fluid densities (e.g., gas/liquid slugs).

SUMMARY

According to some embodiments a method for determining flow rate of a multiphase fluid is described. The method includes measuring a first pressure differential of the multiphase fluid flowing through a rotodynamic pump operating at a rotational speed thereby driving the multiphase fluid. The method also includes measuring a second pressure differential of the multiphase fluid flowing through a portion of a fluid conduit positioned in series with the rotodynamic pump and combining the first and second pressure differentials and the rotational speed of the rotodynamic pump and determining therefrom a flow rate of the multiphase fluid. According to some embodiments, the method also includes altering pump speed based on the determined flow rate of the multiphase fluid so as to maintain the multiphase flow rate within a predetermined range.

According to some embodiments, the multiphase fluid comprises a gas phase, oil liquid phase, and a water liquid phase, and the pump and constriction can be located in a subsea or a land location. According to some embodiments, the rotodynamic pump is a single-stage pump, and the first pressure differential is a pressure difference between an inlet pressure and an outlet pressure of the single-stage pump. According to some embodiments, the pump is a multi-stage pump, and the first pressure differential is a pressure difference between an inlet pressure and an outlet pressure of the multi-stage pump, or across a single stage of the pump.

According to some embodiments, the portion of the fluid conduit is a pressure-based flow meter configured to measure flow rate of a single-phase fluid. In other embodiments, the portion of the fluid conduit is a venturi flowmeter or a constriction of a type such as: venturi; V-cone; orifice plate; dall tube; Pitot tube; and multi-hole pressure probe. In cases where the constriction is a venturi, the second pressure differential is a pressure difference between the inlet and the throat of the venturi.

According to some embodiments, the determined flow rate is used to compare with measurements from a dedicated multiphase flowmeter (such as 3 Schlumberger's VX™ system) and/or to supplement such flowmeters during occasional periods of unavailability.

According to some embodiments, a system is described for determining flow rate of a multiphase fluid. The system includes: a rotodynamic pump configured to drive a multiphase fluid, a fluid conduit positioned in series with the rotodynamic pump and between a wellhead and a topside receiving facility, and a processing system configured to receive a first pressure differential of the multiphase fluid flowing through the pump, a second pressure differential of the multiphase fluid flowing through a portion of the fluid conduit, and a rotational pump speed at which the pump is operating. The processing system is further configured to determine a flow rate of the multiphase fluid based on the first and second pressure differentials and the rotational pump speed.

According to some embodiments the system and method is configured to allow continuous uninterrupted flow rate determination over an extended period of several months to several years.

These together with other aspects, features, and advantages of the present disclosure, as well as the various features of novelty, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following description of exemplary embodiments in combination with the accompanying drawings. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, in which like reference numerals refer to similar elements:

FIG. 6b is a plot showing an example for a pipeline differential pressure reading, according to some embodiments;

DETAILED DESCRIPTION

Figure 1:
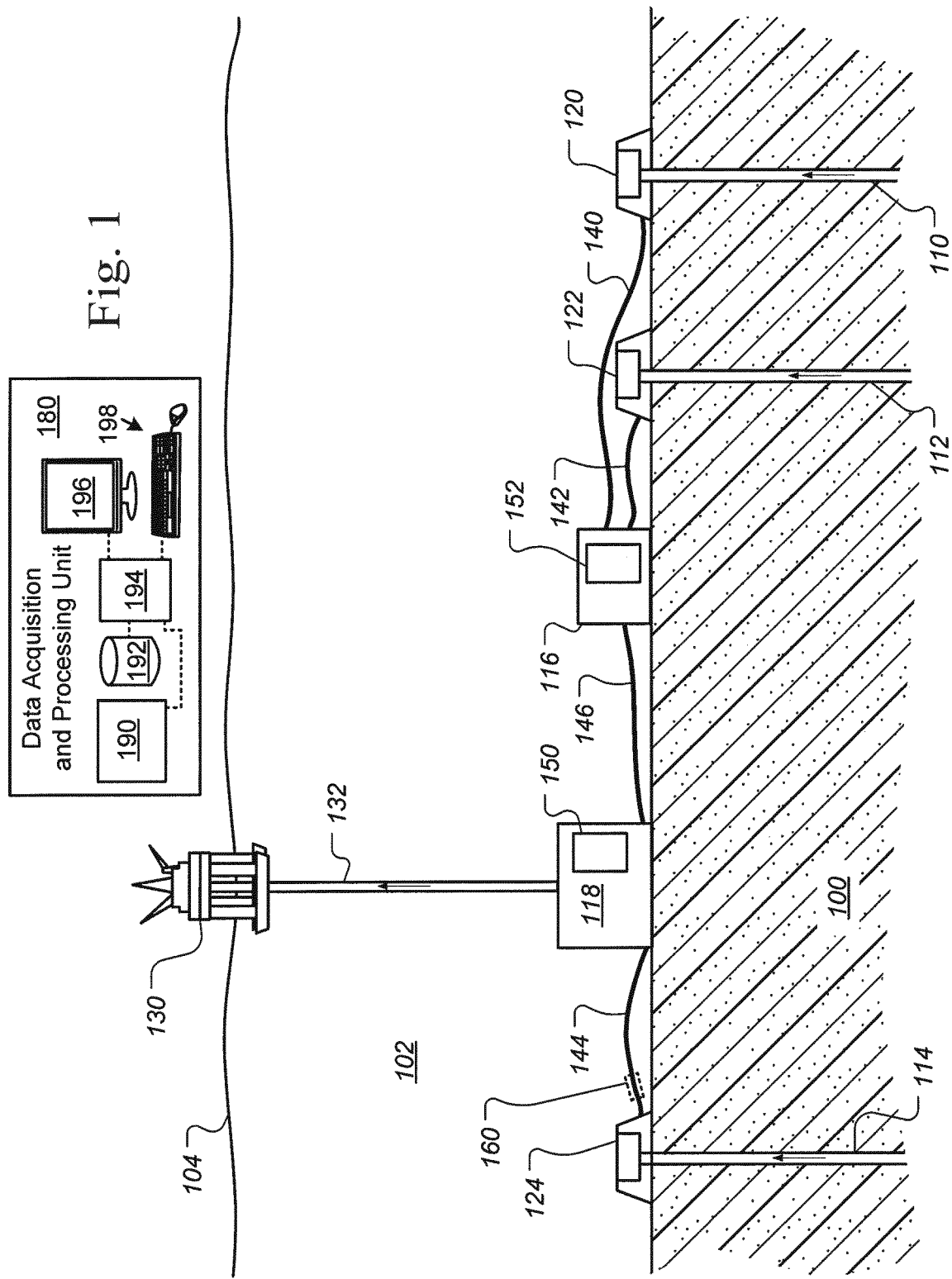
FIG. 1 is a schematic representation of a subsea production setting with which the methods and systems for determining multiphase flow rates can be used, according to some embodiments.

In the following detailed description of the preferred embodiments, reference is made to the accompanying drawings, which form a part hereof, and within which are shown by way of illustration specific examples by which various embodiments of the present disclosure may be practiced. It is to be understood that other embodiments may be utilized, and structural changes may be made without departing from the scope of the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicate like elements.

According to some embodiments, a method is described for determining flow rates of multiphase fluids that includes combining differential pressure data from at least two different locations and pump speed data. Certain embodiments may leverage differential pressure data including differential pressure at the pump and across a flow meter. According to some embodiments, the pump is a single phase rotodynamic pump. However, other embodiments more broadly leverage differential pressure data across other portions of a fluid conduit, such as an upstream flowline or riser, a downstream flowline or riser, or other portion of the fluid conduit from a wellhead to a topside receiving facility. In some cases, the portion of the fluid conduit may include the entire fluid conduit from the wellhead to the topside receiving facility. Depending on context, such other embodiments may be advantageously implemented in systems in which a flow meter is not employed, but where pressure sensors are already installed across sections of the fluid conduit. In this way, a certain level of backward compatibility may be achieved despite the lack of a flow meter in a particular system.

According to some embodiments, a method is described for determining flow rates in multiphase fluid, including: providing a rotodynamic pump configured to boost the flow of the multiphase fluid; providing a flow meter configured to determine the multiphase fluid speed; measuring the differential pressure of the flow meter; measuring the differential pressure of the pump; and combining the differential pressure of the pump, the differential pressure of the flow meter and the pump speed to determine the multiphase fluid flow rate.

According to some embodiments, a method is described for operating a rotodynamic pump driving a multiphase fluid including: measuring the multiphase fluid flow rate using a flow meter; measuring the differential pressure of the flow meter; measuring the differential pressure of the pump; combining the differential pressure of the pump, the differential pressure of the flow meter and the pump speed to determine the multiphase fluid flow rate; and adjusting the operational parameters of the pump based on the multiphase flow rate.

FIG. 1 is a schematic representation of a subsea production setting with which the methods and systems for determining multiphase flow rates can be used, according to some embodiments. Several wells 110, 112 and 114 are being used to extract production fluid from subterranean formation 100. The produced multiphase fluids from wells 110 and 112 move into manifold 116 from wellheads 120 and 122 via sea floor pipelines 140 and 142 respectively. The produced multiphase fluid from well 114 pass from wellhead 124 through pipeline 144 to manifold 118. According to some embodiments, a water cut meter 160 is used to measure the water cut in the production fluid from well 114. The fluid from manifold 116 also passes to manifold 118 via line 146.

The comingled fluid from manifold 118 flows upwards through flowline 132 to a surface production platform 130 on the sea surface 104 of seawater 102.

According to certain other embodiments, manifolds 116 and 118 include a pumping system 152 and 150, respectively, components of which may be used to determine the multiphase flow rates passing through the pumping systems. As will be described in greater detail below, each of the pumping systems 150 and 152 include a rotodynamic pump in addition to a venturi mounted in-line with the pump. In these embodiments, pressure differentials are measured across both the pump and the venturi. Pump speed, for example in rpm, and the pressure differentials are transmitted to the data acquisition and processing unit 180 in production platform 130 to recording and analysis. As will be described in greater detail below, the pressure differentials and pump speed data are combined to determine a multiphase flow rate associated with each of the pumping systems 150 and 152. As explained in further detail below with regard to FIGS. 11-14, the scope of the present disclosure is not limited to embodiments in which pressure drop across a flow meter is required to be ascertained.

According to some embodiments, the processing unit 180 also controls the pumping speeds of pumping systems 150 and 152, so as to keep the pumps within a predetermined operating range based on the determined multiphase flow rates. Note that although three wells and two manifolds are shown in the example of FIG. 1, the techniques described herein are applicable to other numbers of production wells and subsea pumping systems. According to some embodiments, pumping systems such as systems 150 and 152 are installed on each wellhead 120, 122 and 124. In such cases the pressure differentials across the pump and venturi and pumping speed measurements are acquired and the resultant multiphase flow can be determined for each wellhead.

Figure 2:
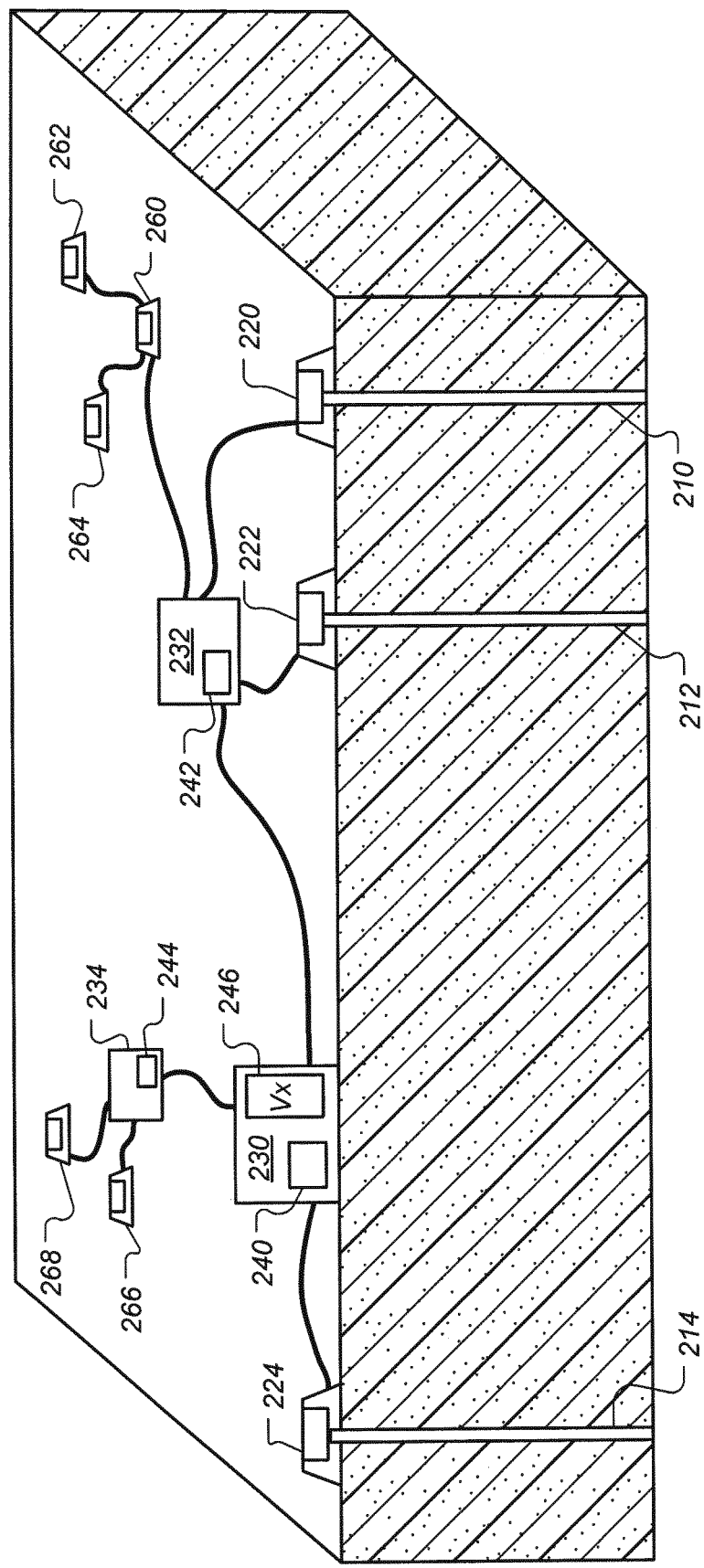
FIG. 2 is a schematic representation of a land-based production setting with which the methods and systems for determining multiphase flow rates can be used, according to some embodiments.

FIG. 2 is a schematic representation of a land-based production setting with which the methods and systems for determining multiphase flow rates can be used, according to some embodiments. Several wells 210, 212 and 214 are shown that are being used to extract production fluid from a subterranean rock formation. Multiphase production fluid from wells 210, 212 and 214 flow up through wellheads 220, 222 and 224 respectively. Also shown in FIG. 2 are wellheads 260, 262, 264, 266 and 268. The produced multiphase fluids from wellheads 220, 222, 260, 262 and 264 flow into a manifold 232. Likewise, produced fluid from wellheads 266 and 268 flow into manifold 234. The produced fluid from manifolds 232 and 234, in turn, flow into facility 230 which can include separation and/or other processing 5 of the produced fluids. According to some embodiments, the facilities 230, 232 and 234 include multiphase pumping systems 240, 242 and 244 respectively, which are similar to pumping systems 150 and 152 shown in FIG. 1. In particular, each of the pumping systems includes a rotodynamic multiphase pump and a venturi in series. The pressure differentials from the pump and venturi, and pump speed are measured and combined to determine the multiphase flow rate associated with the pumping system. According to some embodiments, pumping systems such as systems 240, 242 and 244 are installed on or more of the wellheads 220, 222, 224, 260, 262, 264, 266 and 268. In such cases the pressure differentials across the pump and venturi, and pumping speed measurements are acquired and the resultant multiphase flow can be determined for each such wellhead.

According to some embodiments, facility 230 can also include a separate multiphase flow meter 246, such as Schlumberger's VX™ system, which comprises a vertically mounted Venturi flow meter, a dual energy gamma-ray hold up measuring device and associated processors. In such cases, the determination of multiphase flow rate from pumping system 240 can be used to: (1) supplement the VX™ measurements; and/or (2) control pump speed since flow rate can be determined with shorter sampling time than VX™.

Figure 3:
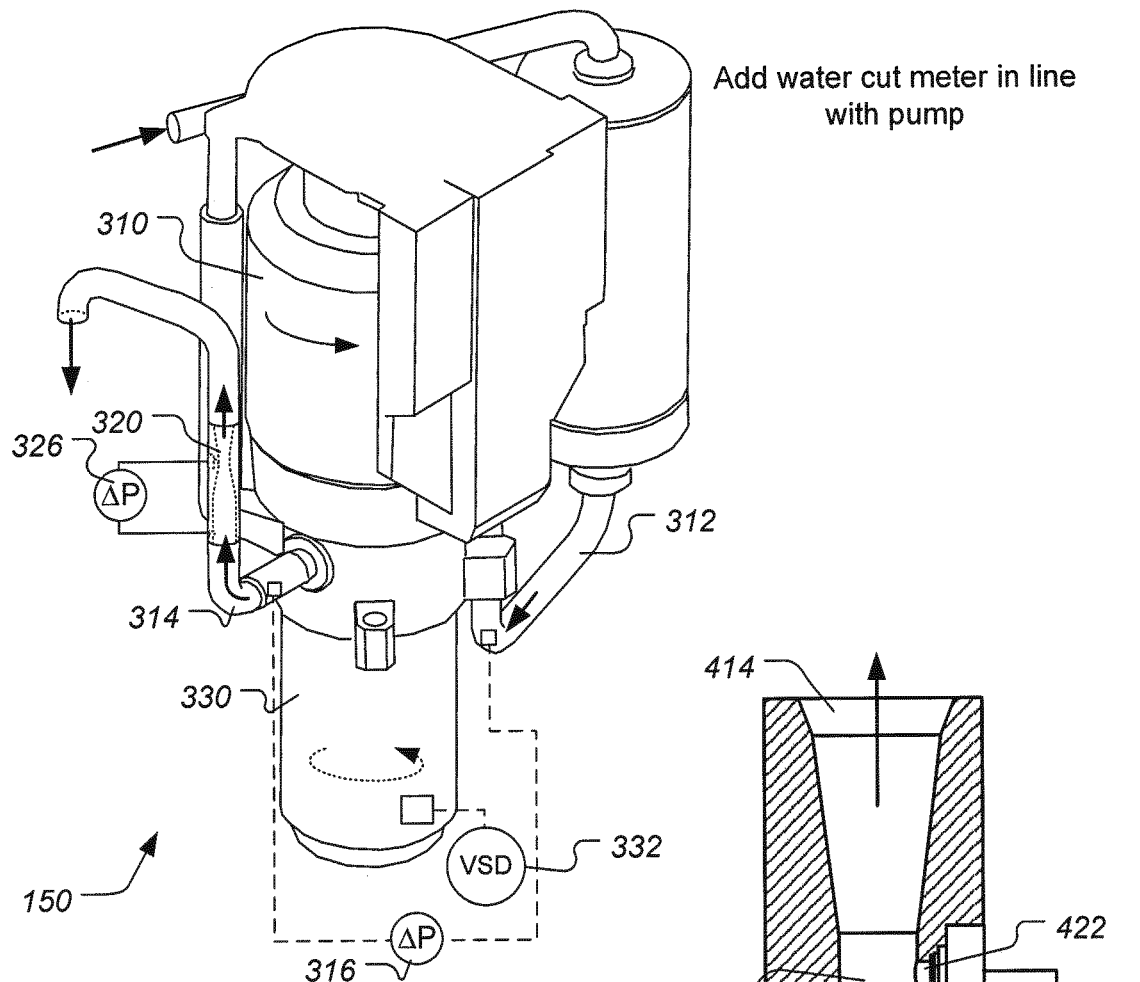
FIG. 3 is a diagram showing aspects of a multiphase pumping system for determining multiphase flow rates, according to some embodiments.

FIG. 3 is a diagram showing aspects of a multiphase pumping system for determining multiphase flow rates, according to some embodiments. Multiphase pumping system 150 includes a multiphase rotodynamic pump 310 and a venturi 320 arranged in series. The pump 320 has an inlet 312 and outlet 314, across which the differential pressure 316 is measured. The pump is driven by a motor 330, from which pump speed 332 can be measured. The venturi 320 is positioned on the outlet 314 of pump 310 as shown in this example. The venturi 320 has an associated differential pressure 326 that is measured between the venturi inlet and the throat, as is shown in FIG. 4, infra.

Figure 4:
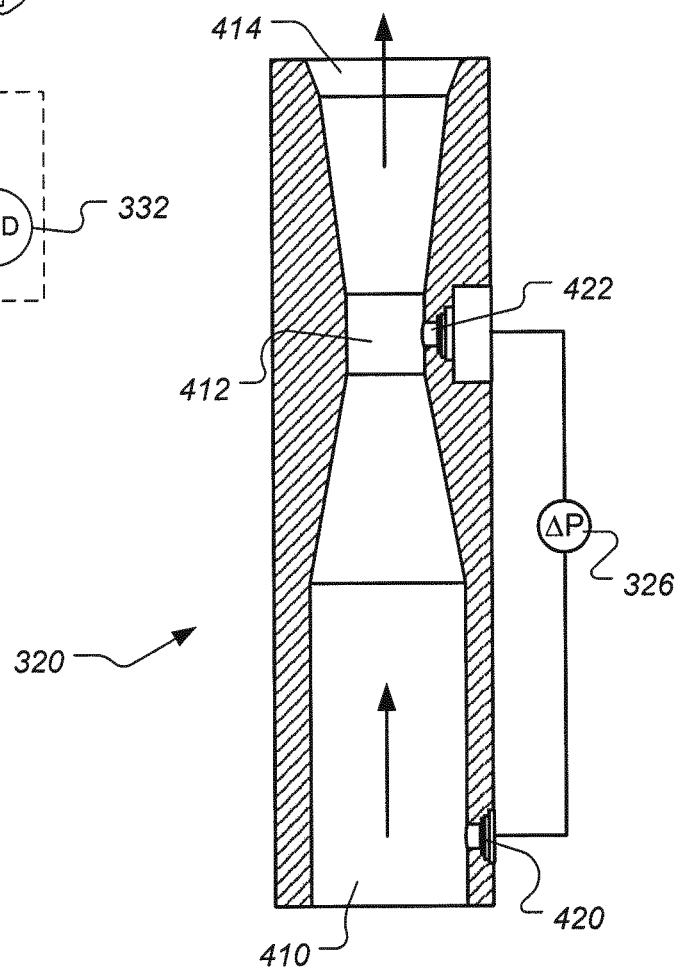
FIG. 4 is a cross section showing further details of a venturi used in determining flow rates for a multiphase fluid, according to some embodiments.

FIG. 4 is a cross section showing further details of a venturi 320 used in certain embodiments of the present disclosure to determine flow rates for a multiphase fluid. Venturi 320 has an inlet 410, throat 412 and outlet 414. The pressure differential 326 is measured as the difference between the inlet pressure probe 420 and throat pressure probe 422. According to some embodiments, the venturi 320 is used for measuring pressure differential since its flow characteristics can be well defined. However, according to some embodiments, other types of constrictions can be used instead of venturi 320. For example, a constriction such as a V-cone; orifice plate; dall tube; Pitot tube; or multi-hole pressure probe can be used instead of venturi 320. Furthermore, other embodiments may operate without the use of venturi 320, but rather by utilizing a pressure differential measured across a different portion of the fluid conduit from the wellhead to a topside receiving facility. Although the venturi 320 is shown positioned near the outlet 314 of pump 310 in FIG. 3, according to some embodiments, the venturi 320 (or other constriction) is positioned in another location in-series with the pump 310, such as near the inlet 312 (suction side) of pump 310 instead of near the outlet 314 (discharge side). According to some embodiments, a water cut meter (such as meter 160 in FIG. 1) can be positioned in series with the pump 310 and venturi 320.

According to some embodiments, automated inputs to the control system in unit 180 (shown in FIG. 1) are used, including one or more of the following: venturi pressure differential using a subsea transmitter; suction and discharge pressures from the pump using subsea transmitters; temperature using a subsea transmitter; and pump speed from the pump variable speed drive (VSD). Further, the following can be automatically calculated and used as inputs to unit 180: oil, water and gas densities from PVT calculations, and a calculated pump speed curve as a function of speed, flow and density.

According to some embodiments, the control system within unit 180 will find a mixture density and a flow rate that matches both the differential pressures for the venturi and for the pump. The pressure differential at minimum flow (DPS) will then be calculated for found mixture density and pump speed.

Figure 6A:
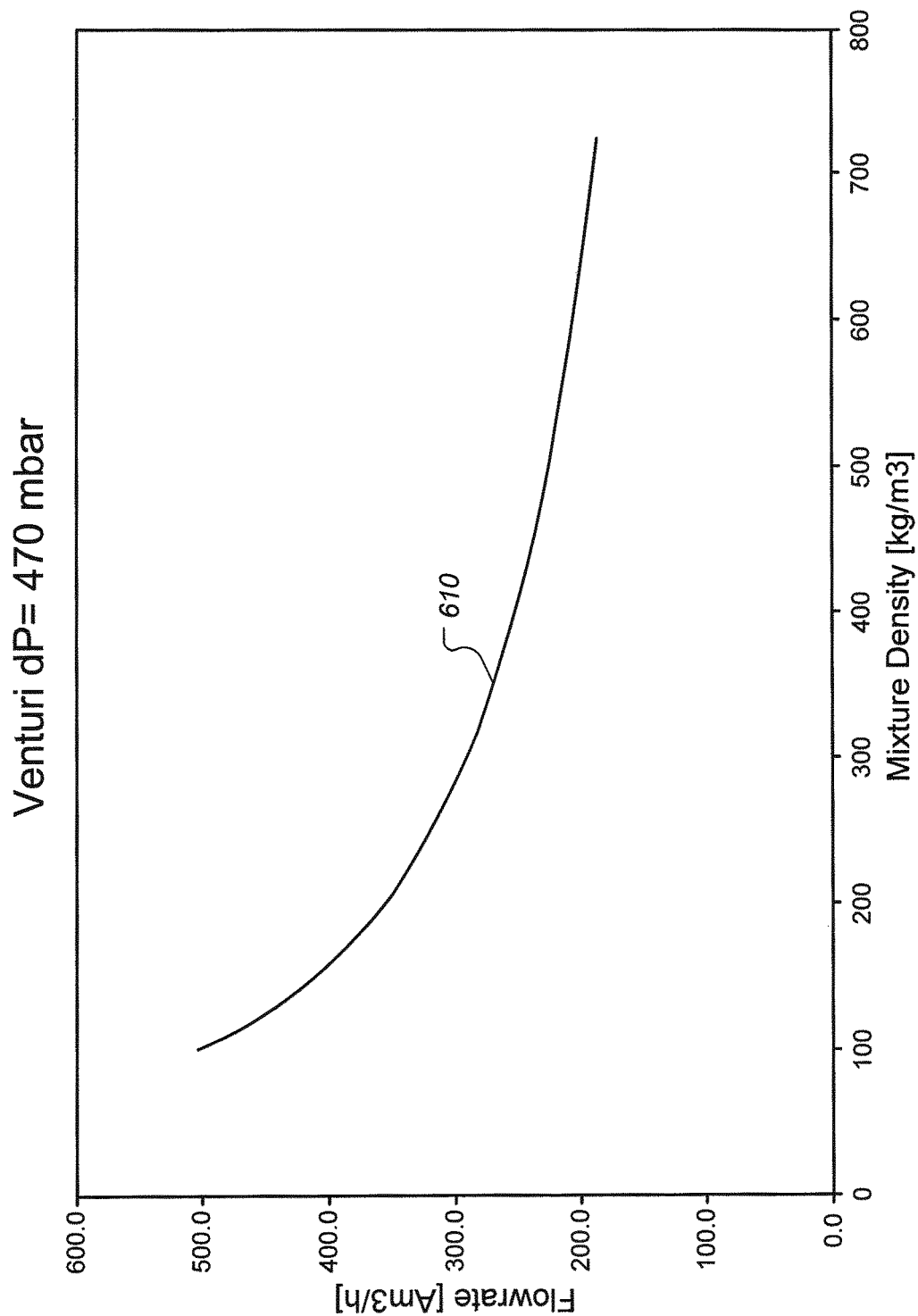
FIG. 6a is a plot showing an example for a venturi differential pressure reading, according to some embodiments.

By reading the differential pressure in the venturi (or other flow meter), the relationship between flow rate and mixture density is known (i.e., what flow rate corresponds to a mixture density ρmix). FIG. 6a shows an example for a venturi meter with differential pressure of 470 mbar.

$$dP\text{flowmeter}=f(Q,\rho\text{mix})$$

While the differential pressure is shown as a function of flow rate and mixture density, it should be appreciated that GVF and viscosity may also influence the differential pressure. Thus, in at least some embodiments, GVF and viscosity may be additionally utilized, for example to improve accuracy. FIG. 6b shows another example relationship between mixture density and flow rate for a 10 bar pressure drop over a pipeline. In particular, in the example of FIG. 6b, the pipeline is a 4" internal diameter horizontal pipeline having a length of 1000 m. As will be explained in further detail below, certain embodiments of the present disclosure do not specifically rely on a venturi or other constriction; rather, a differential pressure value across another portion of the fluid conduit (such as the pipeline utilized to generate the relationship shown in FIG. 6b) between the wellhead and a topside receiving facility may be utilized.

The head curve (head versus flow rate) of a rotodynamic pump can be assumed to be fixed and dependent on pump speed, the type and number of pump impellers and diffusers.

$$\text{Head}=f(Q,\text{Speed})$$

For a given head in cases where gas is not present, the pump differential pressure is approximately proportional to the mixture density:

$$dP\text{pump}=\rho\text{mix Head}$$

The pump differential pressure can then be shown as a function of:

$$dP\text{pump}=f(Q,\text{Speed},\rho\text{mix})$$

By reading pump differential pressure, flow meter differential pressure and pump speed, the equations can be solved (two equations with ρmix and Q as unknowns). i.e. ρmix and Q which solves both equations are found and it is identified if the pump is operated within or outside safe area. Conversely, in embodiments described below in further detail in which a flow meter is not present, a differential pressure value across another portion of the fluid conduit between the wellhead and a topside receiving facility may be alternatively utilized.

According to some embodiments, for a multi-stage pump, the Gas Volume Fraction (GVF) is also used in the calculation of differential pressure (compression of gas means that ρmix will change for each stage).

$$dP\text{pump}=f(Q,\text{Speed},\rho\text{mix},\text{GVF})$$

If liquid and gas density is known, the GVF can be calculated from ρmix directly. If the fluid consists of more than one liquid (typically oil and water), the equation for GVF can be expanded to include watercut. The watercut can either be manually input based on historical data, or it can be input from a watercut meter installed in series with the pump.

The determined multiphase fluid flow rate may indicate if the pump is being operated in a safe range. If not, according to some embodiments, the pump will trip or the control system will adjust speed, recycling rate or other parameters to move the operating point inside the recommended pump operating range.

Figure 5:
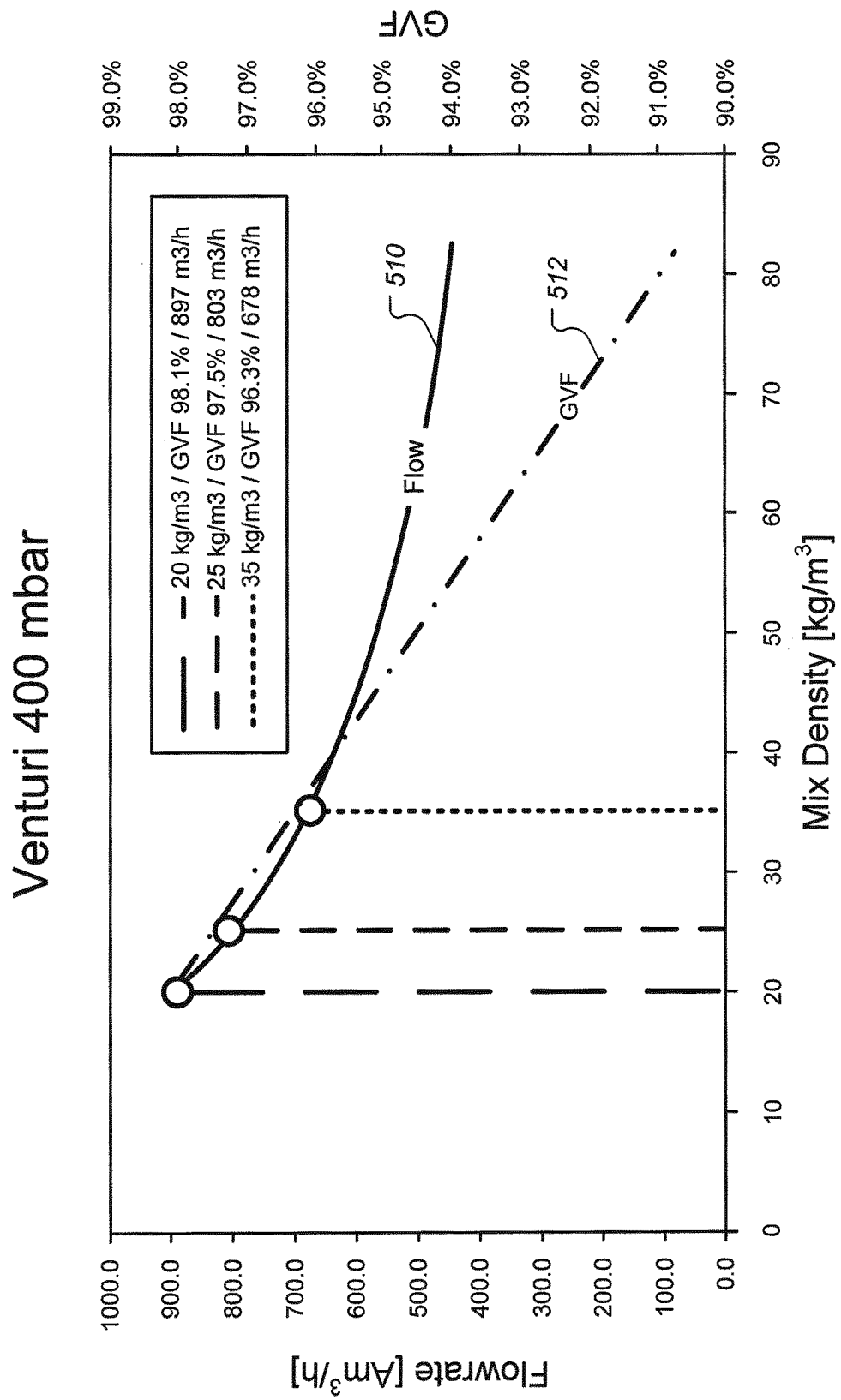
FIG. 5 is a plot showing flow rate versus mixture density for a fixed venturi pressure differential, according to some embodiments.

FIG. 5 is a plot showing flow rate versus mixture density for a fixed venturi pressure differential, according to some embodiments. The flow rate curve 510 shows the flowrates associated with various mixture densities, such as 20, 25 and 35 kg/m³. The curve 512 shows GVF versus mixture density, which can be calculated using the density inputs ρwater, ρoil, and ρgas, and the watercut.

FIG. 6 is a plot showing an example for a venturi differential pressure reading, according to some embodiments. In the example shown, the curve 610 represents the relationship between flow rate and mixture density for a differential pressure reading of 470 mbar.

Figure 7:
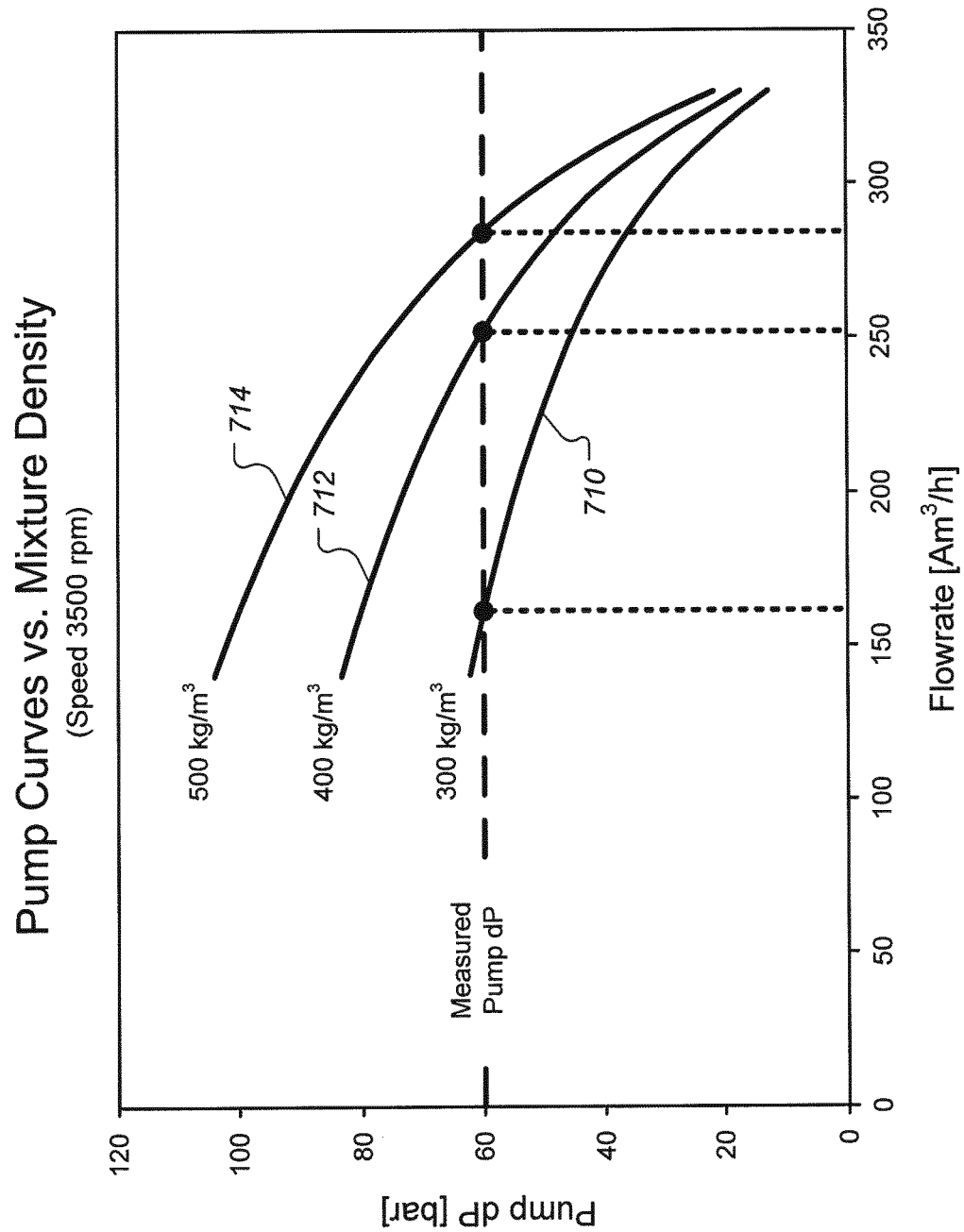
FIG. 7 is plot showing example pump curves for different mixture densities, according to some embodiments.

FIG. 7 is plot showing example pump curves for different mixture densities, according to some embodiments of the present disclosure. In the example shown in FIG. 7, curves 710, 712 and 714 show the relationship between pump differential pressure and flow rate for mixture densities of 300 kg/m³, 400 kg/m³ and 500 kg/m³, respectively, when the pump speed is 3500 rpm. For example, at a measured pump differential pressure of 60 bar, the flowrates can be determined, as shown.

Figure 8:
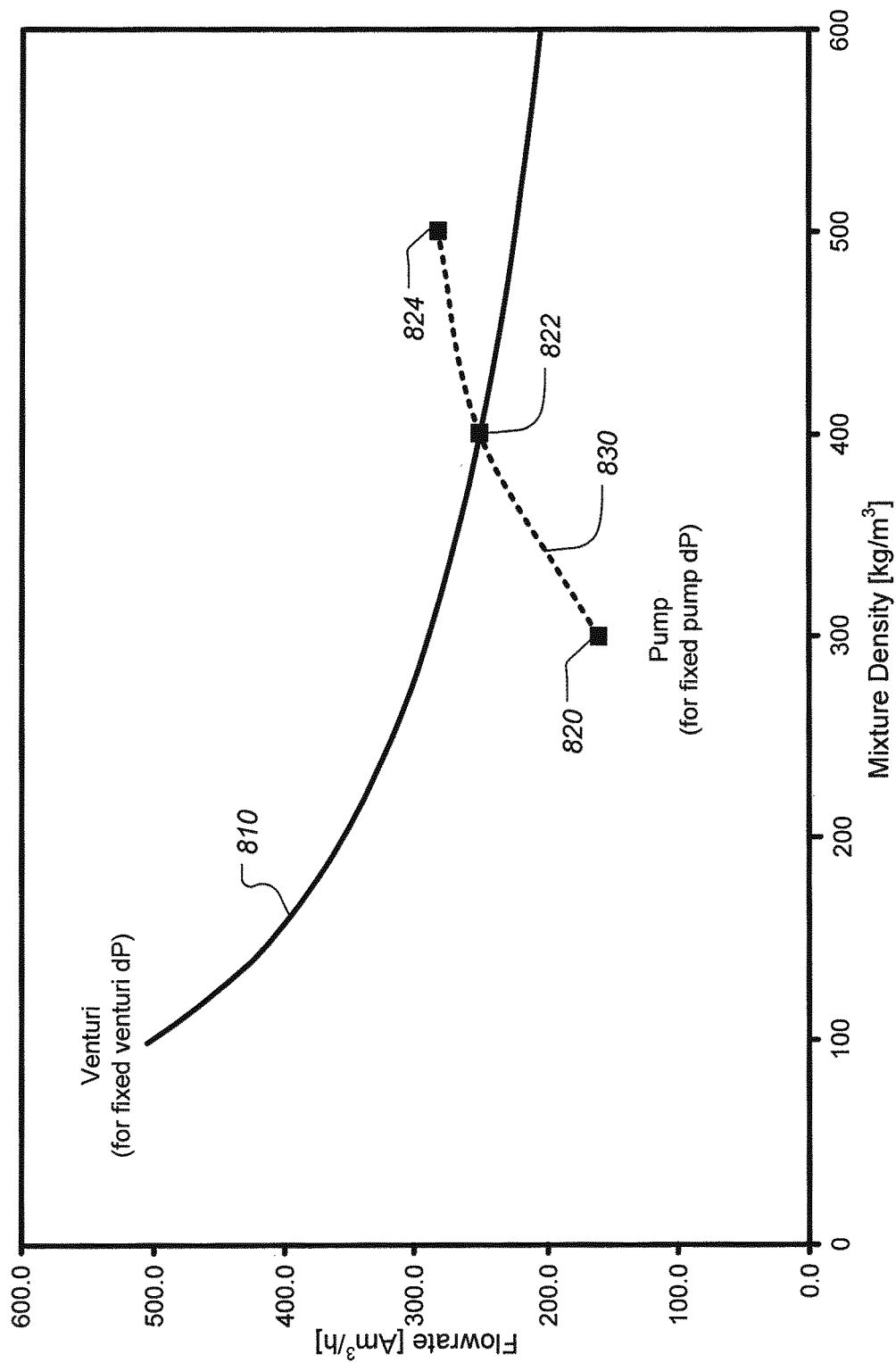
FIG. 8 is a plot showing an example of determining the flowrate and mixture density, according to some embodiments.

FIG. 8 is a plot showing an example of determining the flowrate and mixture density, according to some embodiments. In this example, the venturi curve 810 is plotted for the measured differential pressure across the venturi. The solution points 820, 822 and 824 are plotted for pump for each density at the measured pump pressure differential, such as using the pump curves shown in FIG. 7, yielding pump curve 830. The crossing point of curves 810 and 830 gives the solution, which in this example is a flow rate of 250 Am³/h and mixture density of 400 kg/m³.

Figure 9:
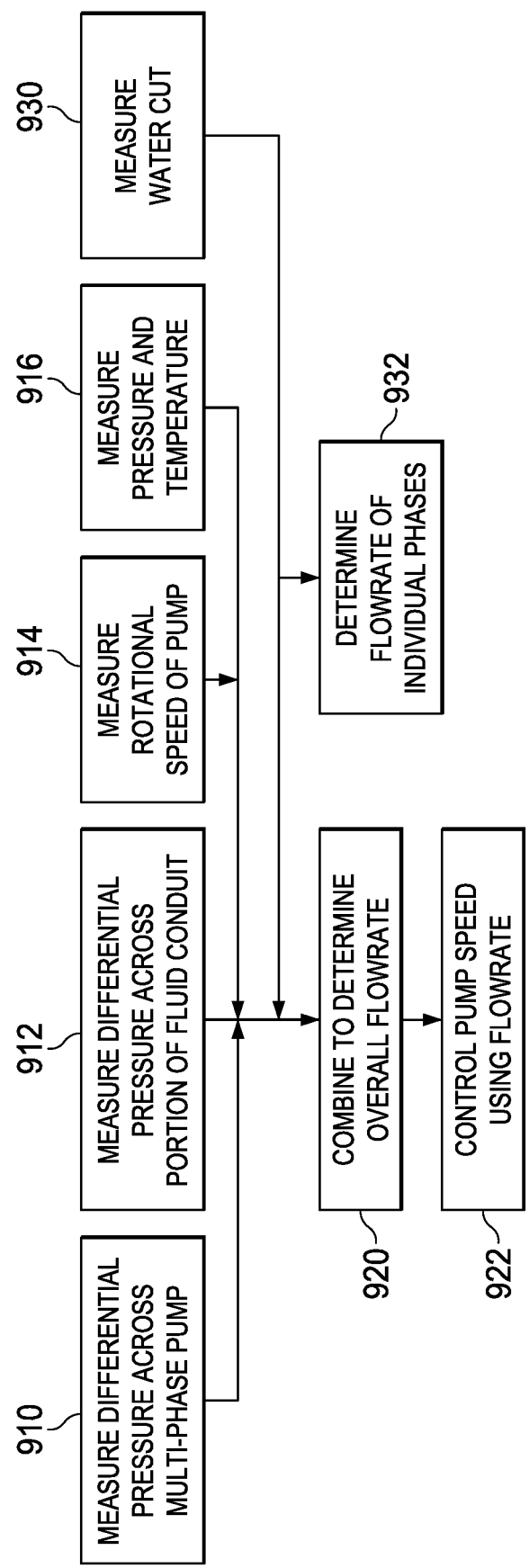
FIG. 9 is a flow chart showing aspects of a method for determining multiphase flow rates, according to some embodiments.

FIG. 9 is a flow chart showing aspects of a method for determining multiphase flow rates, according to some embodiments. In block 910, the differential pressure is measured between the suction side and discharge side of a multiphase rotodynamic pump, such as pump 310 in FIG. 3. In block 912, the differential pressure is measured between the inlet and throat of the venturi, such as venturi 320 in FIG. 3 (or across another suitable flow constriction, or other portion of the fluid conduit formed between a wellhead and a topside receiving facility) that is in series with the pump. In block 914, the rotational speed of pump is measured. According to some embodiments, in block 916, the pressure and temperature are measured for use in the multiphase pump curve calculation (gas is compressed through the pump). According to some embodiments, measured pressure and temperature is also used in the PVT model to calculate gas, oil and water densities. The data from blocks 910, 912, 914, and 916 are transmitted to a control system, for example within processing unit 180 in FIG. 1. In block 920, the data are combined, such as described herein supra, to determine the overall flow rate for the multiphase fluid passing through the pump and optional venturi. In block 922, the pumping speed is controlled to maintain the flow rate within a desired operating range. In block 930, if available, water cut is incorporated into the determination of flow rate in block 920, as described herein, supra. In other cases, water cut can be supplied using historical data. In cases where water cut is known or measured, the individual flow rates can be determined in block 932.

According to some embodiments, the flow rate for the multiphase fluid can be determined without the use of a pressure-based flowmeter or other constriction regardless of whether the mixture density is known. Volume or velocity type flow meters can be used, according to some embodiments. For example, turbine meters, positive displacement meters, drag-force meters and/or ultrasonic meters can be used. Such meters give a volumetric flow rate. According to some embodiments, a method uses a fixed flow and pump curves tested at different mixture densities. Using the example plots of FIG. 7, where the measured flow rate is 250 Am³/h, the solution is where the pump curve fulfills Q=250

Figure 10:
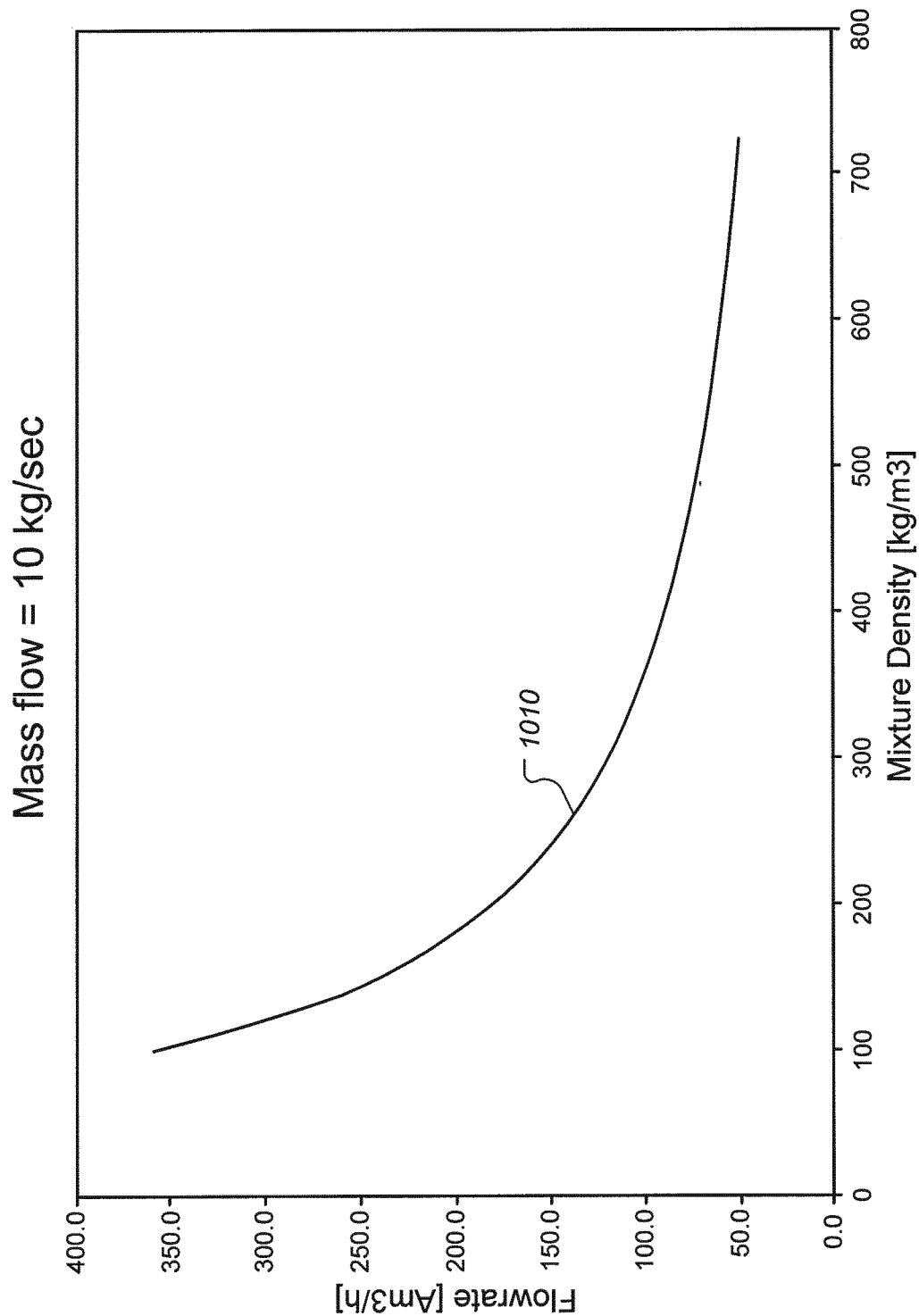
FIG. 10 is a plot showing a relationship between flow rate and mixture density for an example for a given mass flow reading, according to some embodiments.

Am³/h and dP=60 bar (i.e. 400 kg/m). According to some other embodiments, a mass flow meter (e.g., a Coriolis meter) can be used to give a mass flow rate (e.g., in kg/sec). This method is similar to that described using a venturi, except for the relationship between the flow rate and mixture density. FIG. 10 is a plot showing a relationship between flow rate and mixture density for an example for a given mass flow reading, according to some embodiments. In the example shown, the curve 1010 represents the relationship between flow rate and mixture density for a mass flow reading of 10 kg/sec.

As explained above, although certain embodiments of the present disclosure leverage a measurement of pressure drop across a venturi or flow meter or other type of constriction positioned in series with the pump, the scope of the present disclosure need not require such a venturi or constriction. In the following described embodiments, a pressure drop across an upstream or downstream flowline and/or riser may be utilized in conjunction with the pressure drop across the pump to determine a multiphase flow rate through the pump.

Advantageously then, pressure (and optionally temperature) readings that are already available in an installed system, but which might not include a venturi or other constriction, may be utilized. Thus, embodiments of the present disclosure may extend not only to systems in which a venturi or other constriction exists, but also to those systems that are already installed. In particular, embodiments of the present disclosure can be leveraged on existing fluid conduits where it may not be practical or feasible to incorporate a venturi or other flow meter or constriction, but where pressure sensors exist to permit measurement of a pressure drop across a portion of the fluid conduit.

Figure 11:
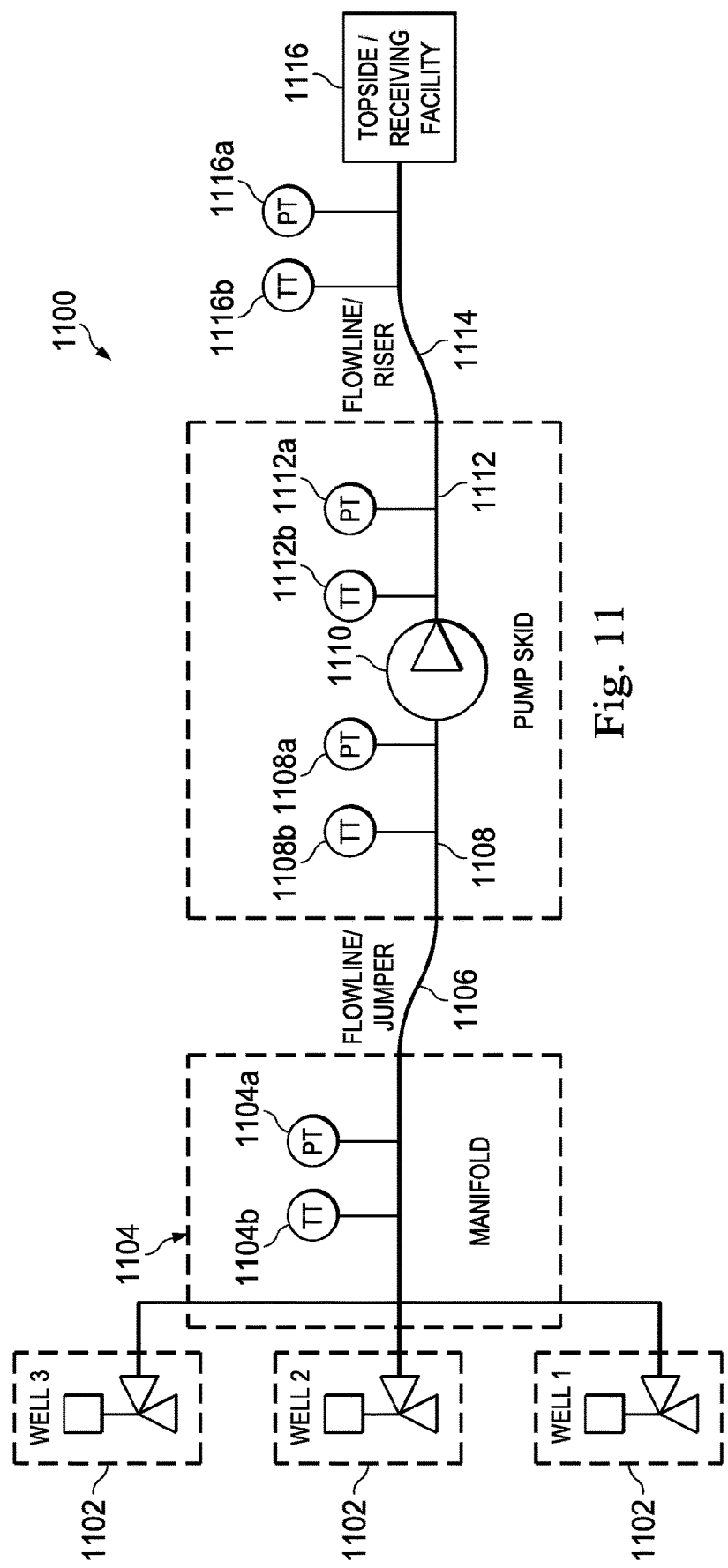
FIG. 11 is another schematic representation of a subsea production setting with which the methods and systems for determining multiphase flow rates can be used, according to some embodiments.

Turning now to FIG. 11, another example of a multiphase pump system 1100 is shown in accordance with various embodiments of the present disclosure. The multiphase pump system 1100 includes several wellheads 1102 that are routed to a manifold 1104, which commingles fluids from the wellheads 1102. The flow from the manifold 1104 is routed through an upstream flowline (or pipeline) 1106 to an inlet 1108 of a pump 1110. In embodiments where the pump 1110 is located proximate to the manifold 1104, a jumper or spool pipe may be utilized as the upstream flowline 1106. An output 1112 of the pump 1110 leads to a downstream flowline 1114, which routes pumped fluid to a topside receiving facility 1116. In embodiments where the pump 1110 is located subsea, the downstream flowline 1114 may also comprise a riser.

Pressure sensors (notated as 'a') and temperature sensors (notated as 'b') may be installed at the wellheads 1102, the manifold 1104, the pump inlet 1108, the pump outlet 1112, and the receiving facility 1116 (i.e., topside). In certain cases, only pressure sensors may be installed. Thus, pressure readings (and possibly temperature readings) are available at various locations of the fluid conduit from a wellhead 1102 to the topside receiving facility 1116.

Based on the various pressure readings available from the pressure sensors along the fluid conduit between the wellheads 1102 and the topside receiving facility 1116, pressure drop values may be determined across upstream flowline/jumper 1106 (e.g., using the wellhead or manifold pressure reading 1104*a* and the pump inlet pressure reading 1108*a*) or downstream flowline/riser 1114 (e.g., using the pump outlet pressure reading 1112*a* and the topside receiving facility pressure reading 1116*a*). In cases where the pump 1110 is located close to the wellheads 1102 and manifold 1104, leveraging the pressure drop across the downstream flowline/riser 1114 is beneficial due to a higher pressure drop, which gives an improved accuracy. However, various embodiments of the present disclosure may leverage the pressure drop across many different portions of the fluid conduit from the wellhead 1102 to the topside receiving facility 1116. Further, the accuracy of a flow rate determination according to disclosed embodiments may be improved in cases where temperature readings (and thus temperature drop based on those readings) are also available.

Figure 12:
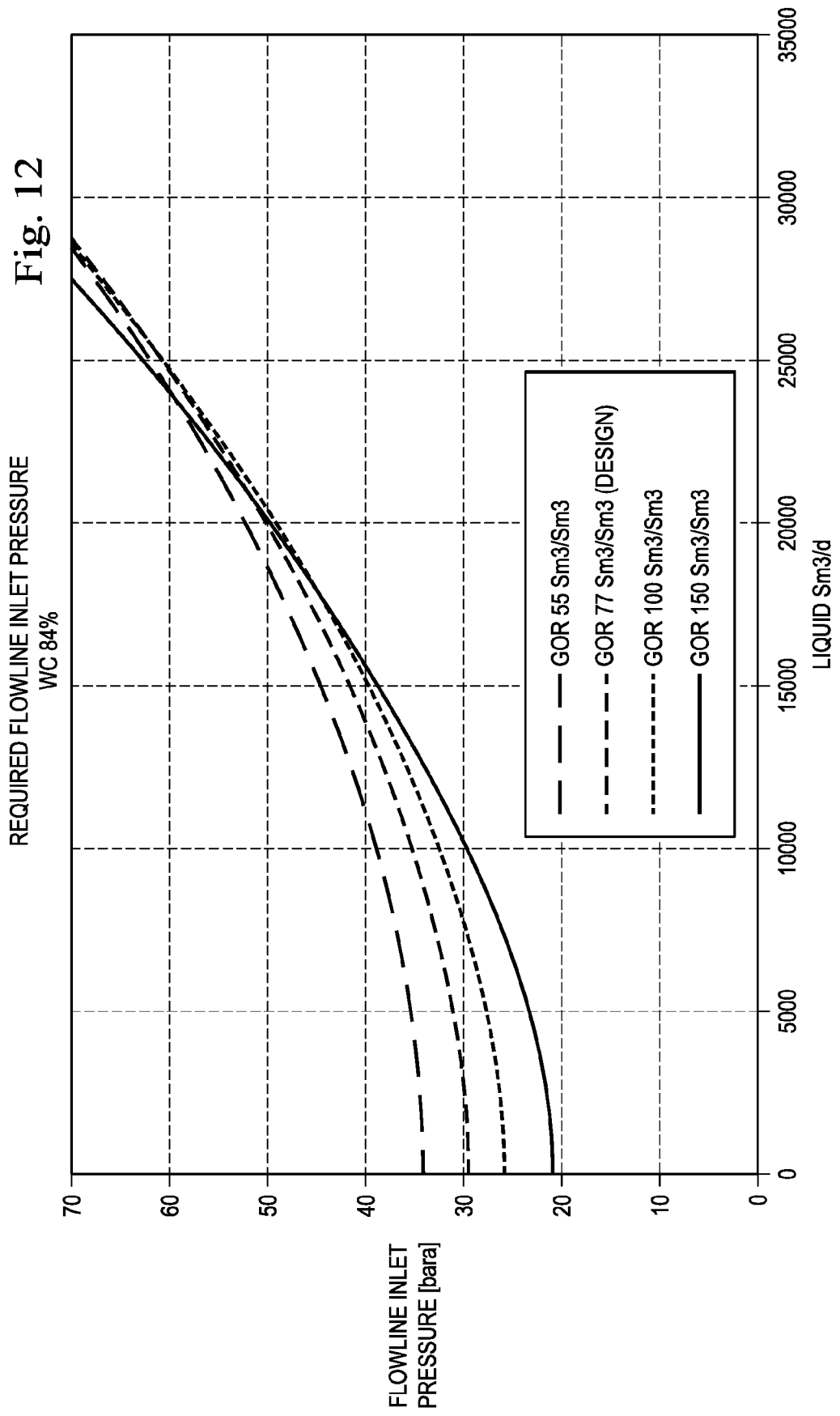
FIG. 12 is a plot showing example required flowline inlet pressures versus gas oil ratio (GOR) and liquid flow rate, according to some embodiments.

As one example, the pressure drop through a downstream flowline/riser 1114 in a subsea environment is considered. In particular, FIG. 12 shows required flowline inlet pressure versus GOR and liquid flow rate. The curves are based on a fixed watercut, a fixed temperature, and a fixed topside receiving pressure 1116*a*. In this example, both temperature and pressure are measured at the pump outlet 1112*a*, 1112*b* and the topside receiving facility 1116*a*, 1116*b*. Watercut is fairly stable and does not change rapidly, and may be input manually or may be measured at the receiving facility 1116.

The example is based on the main readings of pump speed being 3000 rpm, pump inlet pressure 1108*a* being 20 bara, pump outlet pressure 1112*a* being 50 bara, pump inlet temperature 1108*b* being 60 degrees C., and watercut being 84% (measured or input manually). The liquid flow rate and GOR parameters are unknown. The actual volumetric flow-rate at the multiphase pump inlet 1108 is dependent on GOR. For example, with a higher GOR, the volumetric gas rate will increase and the pump 1110 will provide a lower capacity with respect to liquid. Another effect of a higher GOR is a lower mixture density and therefore a lower pressure drop generated by the pump 1110.

Figure 13:
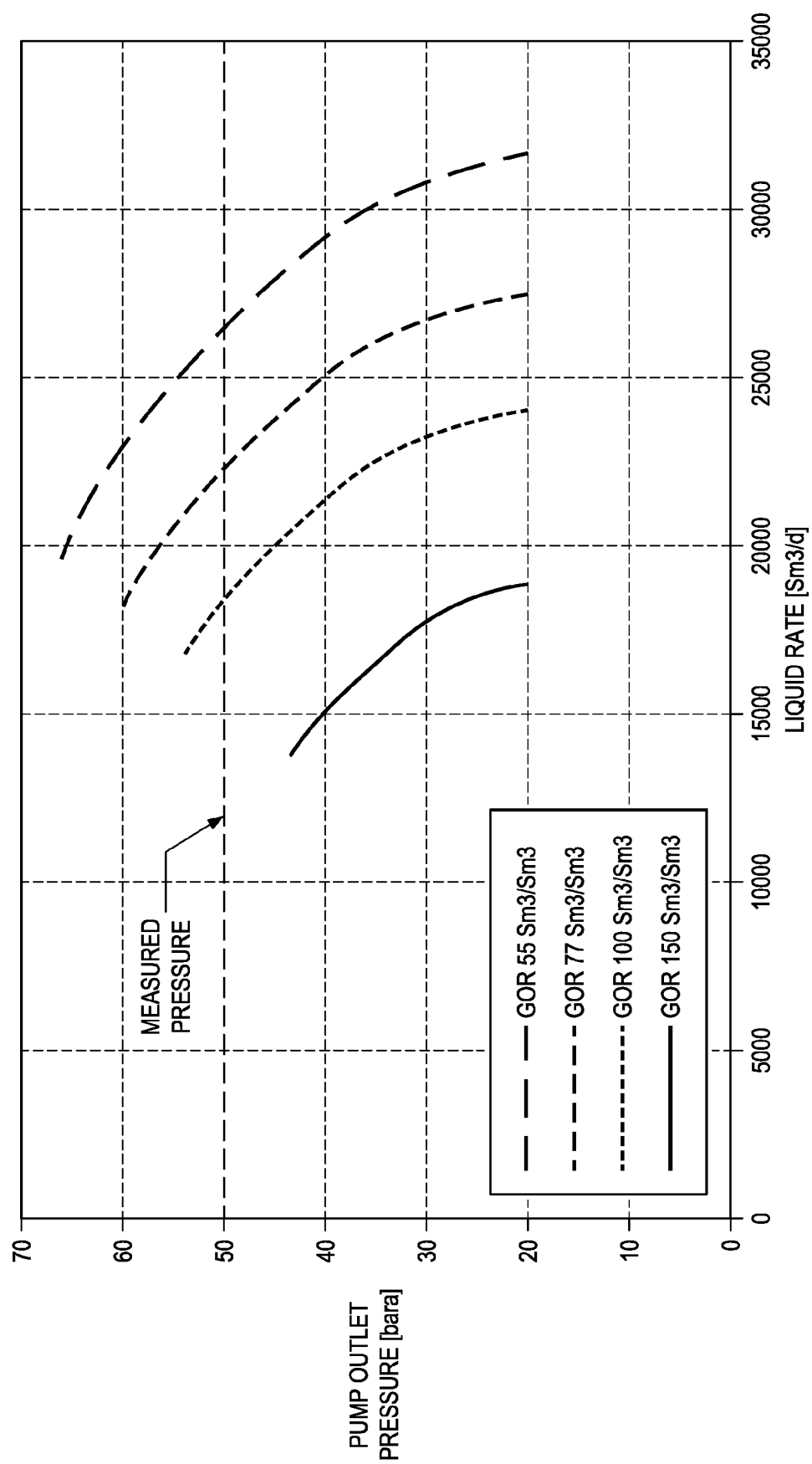
FIG. 13 is a plot showing example pump outlet pressures as a function of liquid flow rates for varying GOR, according to some embodiments.

FIG. 13 shows 3000 rpm speed curves for different GOR values. The pump outlet pressure 1112*a* is plotted against liquid flow rate at standard conditions. The crossing point between the measured 50 bara outlet pressure 1112*a* and the particular speed curve gives the liquid capacity of the pump 1110 at that GOR.

Figure 14:
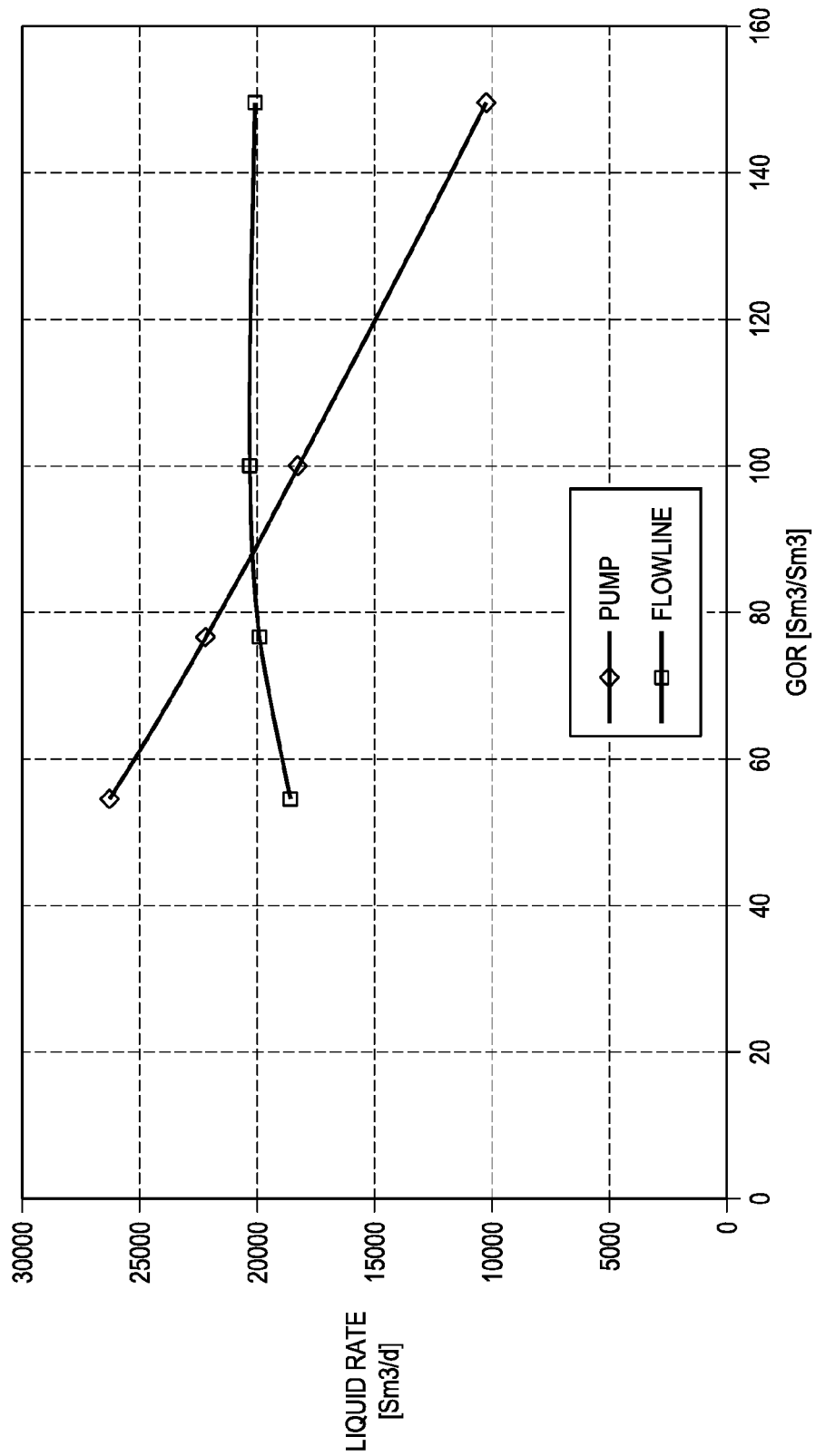
FIG. 14 is a plot showing an example flow rate determination, according to some embodiments.

FIG. 14 shows a curve representing the liquid capacity of the flowline 1106, 1114 at a pressure of 50 bara versus GOR, using values determined from FIG. 12. FIG. 14 shows another curve representing the liquid flow rate of the pump 1110 versus GOR, using values determined from FIG. 13. The crossing point of the liquid capacity of the flowline 1106, 1114 versus GOR curve and the liquid flow rate of the pump 1110 versus GOR curve represents the solution to determine the current or operational liquid flow rate through the pump 1110. In the illustrated example of FIGS. 12-14, the liquid flow rate is approximately 20,000 Sm3/d and the GOR is approximately 88 Sm3/Sm3. Using PVT conversion, the volumetric rate at pump inlet pressure 1108*a* and temperature 1108*b* is 1320 Am3/h and the GVF is 36%.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicated like elements.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting.

It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for determining flow rate of a multiphase fluid comprising:
   measuring a first pressure differential of the multiphase fluid flowing through a rotodynamic pump operating at a rotational speed thereby driving the multiphase fluid;
   measuring a second pressure differential of the multiphase fluid flowing through a portion of a fluid conduit positioned in series with said rotodynamic pump; and
   determining, based on the first and second pressure differentials and the rotational speed of said rotodynamic pump, a flow rate of the multiphase fluid.

2. The method of claim 1 further comprising altering a pump speed based on said determined flow rate of the multiphase fluid so as to maintain the multiphase flow rate within a predetermined range.

3. The method of claim 1 wherein the multiphase fluid comprises an oil liquid phase and a water liquid phase, and said pump and portion of the fluid conduit are located in a subsea location.

4. The method of claim 1 wherein the multiphase fluid comprises an oil liquid phase and a water liquid phase, and said pump and portion of the fluid conduit are located on land.

5. The method of claim 1 wherein the multiphase fluid comprises a gas phase, an oil liquid phase and a water liquid phase.

6. The method of claim 1 wherein said rotodynamic pump is a single-stage pump, and said first pressure differential is a pressure difference between an inlet pressure and an outlet pressure of said single-stage pump.

7. The method of claim 1 wherein said rotodynamic pump is a multi-stage pump, and said first pressure differential is a pressure difference between an inlet pressure and an outlet pressure of said multi-stage pump.

8. The method of claim 1 wherein said rotodynamic pump is a multi-stage pump, and said first pressure differential is a pressure difference between an inlet pressure and an outlet pressure of said a single-stage of said multi-stage pump.

9. The method of claim 1 wherein said portion of the fluid conduit is a pressure-based flowmeter configured to measure flow rate of a single-phase fluid.

10. The method of claim 1 wherein said portion of the fluid conduit is a venturi having an inlet and a throat, and said second pressure differential is a pressure difference between said inlet and said throat of the venturi.

11. The method of claim 1 wherein said portion of the fluid conduit comprises a constriction of a type selected from a group consisting of: venturi; V-cone; orifice plate; dall tube; Pitot tube; and multi-hole pressure probe.

12. The method of claim 1 further comprising comparing said determined flow rate for the multiphase fluid with a flow rate for the multiphase fluid determined using a multiphase flow meter.

13. The method of claim 1 further comprising using said determined flow rate for the multiphase fluid to supplement a multiphase flow meter during times of unavailability of the multiphase flow meter.

14. A system for determining flow rate of a multiphase fluid comprising:
   a rotodynamic pump configured to drive a multiphase fluid;
   a fluid conduit positioned in series with said rotodynamic pump and between a wellhead and a topside receiving facility; and
   a processing system configured to:
      receive a first pressure differential of the multiphase fluid flowing through said pump;
      receive a second pressure differential of the multiphase fluid flowing through a portion of said fluid conduit;
      receive a rotational pump speed at which the pump is operating; and
      determine, based on the first and second pressure differentials and the rotational pump speed, a flow rate of the multiphase fluid.

15. The system of claim 14 wherein the processing system is further configured to alter a pump speed based on said determined flow rate of the multiphase fluid so as to maintain the multiphase flow rate within a predetermined range.

16. The system of claim 14 wherein the multiphase fluid comprises an oil liquid phase and a water liquid phase, and said pump and portion of the fluid conduit are located in a subsea location.

17. The system of claim 14 wherein the multiphase fluid comprises a gas phase, an oil liquid phase and a water liquid phase.

18. The system of claim 14 wherein said first pressure differential is a pressure difference between an inlet pressure and an outlet pressure of said rotodynamic pump.

19. The system of claim 14 wherein said portion of the fluid conduit is a venturi having an inlet and a throat, and said second pressure differential is a pressure difference between a said inlet and said throat of the venturi.

20. The system of claim 14 wherein said portion of the fluid conduit comprises a constriction of a type selected from a group consisting of: venturi; V-cone; orifice plate; dall tube; Pitot tube; and multi-hole pressure probe.

21. A method for determining flow rate of a multiphase fluid comprising:
   measuring a pressure differential of the multiphase fluid flowing through a rotodynamic pump operating at a first rotational speed thereby driving the multiphase fluid;
   determining a mixture density for the multiphase fluid flowing across a portion of a fluid conduit in series with the rotodynamic pump; and
   combining the differential flow rate, mixture density, and the rotational speed of the rotodynamic pump thereby determining a flow rate of the multiphase fluid.

22. The method of claim 21 wherein the portion of the fluid conduit comprises a volume or velocity flowmeter that measures a volumetric flowrate, and said mixture density is based on a known relationship between differential pressure across said pump and flow rate for a plurality of mixture densities.

23. The method of claim 22 wherein the flowmeter is of type selected from a group consisting of: turbine meter; positive displacement meter; drag force meter; and ultrasonic flow meter.

24. The method of claim 23 wherein the flowmeter is a mass flow meter, and said mixture density is determined based on a known relationship between flow rate and mixture density for a mass flow rate measured by the mass flow meter.

* * * * *